Nov. 8, 1960  F. D. BRUNER  2,959,772
WHEEL SLIP OR SLIDE INDICATOR
Filed Sept. 29, 1958  3 Sheets-Sheet 1

INVENTOR.
Frank D. Bruner,
BY

Nov. 8, 1960 F. D. BRUNER 2,959,772
WHEEL SLIP OR SLIDE INDICATOR
Filed Sept. 29, 1958 3 Sheets-Sheet 2
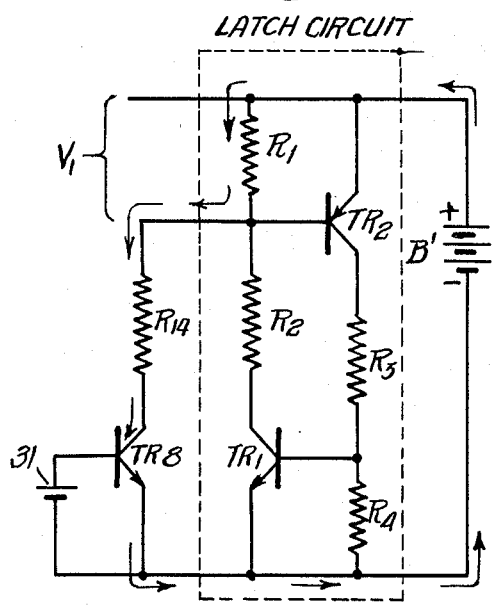
Fig. 3. LATCH CIRCUIT
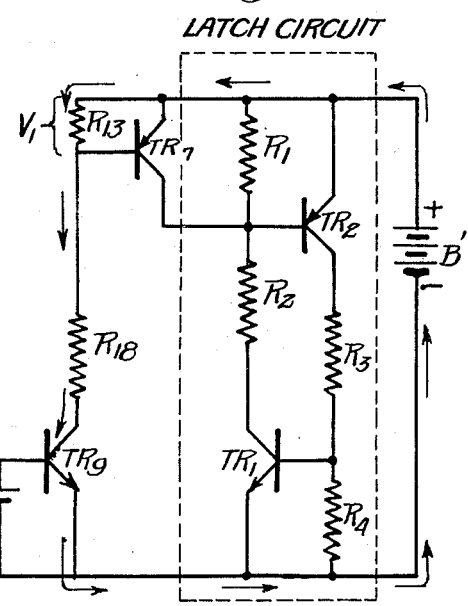
Fig. 4. LATCH CIRCUIT
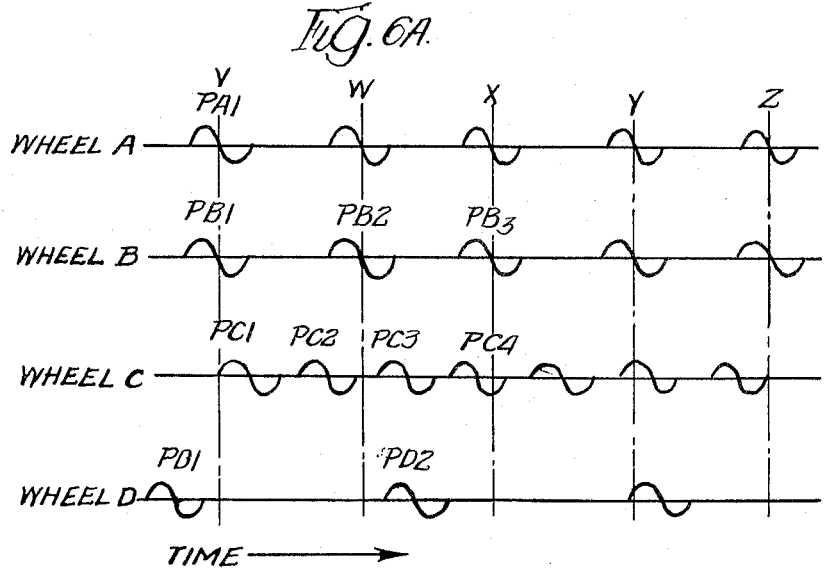
Fig. 6A.
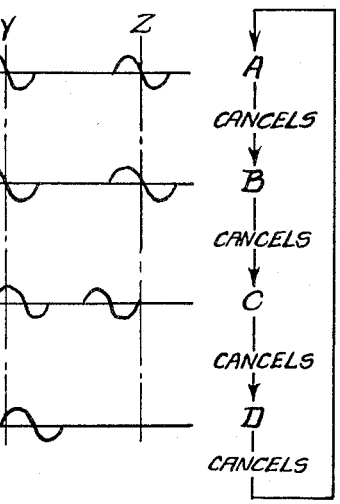
Fig. 6B.
INVENTOR.
Frank D. Bruner,
BY
ATTY.

Nov. 8, 1960   F. D. BRUNER   2,959,772
WHEEL SLIP OR SLIDE INDICATOR
Filed Sept. 29, 1958   3 Sheets-Sheet 3

INVENTOR.
Frank D. Bruner,
BY

United States Patent Office 2,959,772
Patented Nov. 8, 1960

2,959,772
WHEEL SLIP OR SLIDE INDICATOR

Frank D. Bruner, Omaha, Nebr., assignor to Stanray Corporation, a corporation of Delaware Filed Sept. 29, 1958, Ser. No. 763,888

9 Claims. (Cl. 340—278)

The present invention relates to systems and arrangements for detecting differentials in the rotative speeds of two or more drive elements of a power unit. More specifically, the invention relates to a system and apparatus for sensing the slipping and the sliding of vehicle wheels such as on railway locomotives and cars.

For purposes of this disclosure, the term "slipping" as applied to a vehicle wheel refers to the rotation of the wheel at a speed greater than the speed of the vehicle at any given instant. The term "sliding" as applied to a vehicle wheel refers to the rotation of the wheel at a speed less than the speed of the vehicle at a given instant.

The rotational speed of a driven axle, measured in revolutions per minute, is a mathematical function of a vehicle speed. A mathematical comparison of r.p.m. between like diameter wheels, or axles carrying like diameter wheels, is a convenient means for determining whether a particular wheel is slipping or sliding in relation to the other compared wheels. The logical approach to such a mathematical comparison is to employ measuring devices that can compute and compare wheel r.p.m.'s but such devices are quite complicated and sensitive and are not well adapted to the rugged usage to which they would be subjected in a locomotive, for example.

It is a general object of the present invention to provide an improved and simplified speed differential detection system for drive shafts of a multiple drive power unit.

It is another object of the present invention to provide an improved and simplified system that can detect in a drive system whether a wheel in the system is slipping or sliding in relation to other wheels in the system.

A more specific object of the invention is to provide a computer system for two or more wheels which is responsive to any differential in the rate of travel as between the wheels.

A further object of the invention is to provide an improved speed differential detection system of a highly sensitive nature and requiring only infinitesimal amounts of power so as to insure its dependability and long life.

An additional object of the invention is to provide an improved speed differential detection system for a multiple wheel drive system wherein each wheel is provided with its own transistorized computer and wherein all of the computer systems are connected in chain and operated from both its associated wheel and a comparison wheel so that under normal circumstances each computer will count each revolution of its own wheel and be restored or erased by the completion of one revolution of the comparison wheel. Any computer which records more than one revolution for its associated wheel during one revolution of the comparison wheel will be operated so as to indicate the differential speed between the two wheels.

The system of the present invention was developed primarily for use on locomotives and cars. However, its application covers any field where a comparison of rotational speed is desired. This system measures the peripheral speed of a given point on the circumference of a wheel and compares that with a complementary point on another wheel or group of wheels. This speed is measured in distance traveled around the circumference, per unit time. If the minute or second were used for a measure of unit time, some clocking device would be necessary. However, this system has a flexible time base in that the revolutions count interval of any wheel is based upon the time required for its comparison wheel to make a revolution. Under ideal conditions, the time required for two drive wheels to make their revolutions is the same, providing their diameter is the same and they are traveling under the same vehicle. If a computer were attached to each wheel and its computing time based on the revolution time of the other wheel, each wheel would count one revolution per revolution of the other. So long as their peripheral speed remained the same, neither wheel should compute above a count of "one." If one wheel should gain speed, a point on its circumference would pass a reference point twice within the computing time allowed by the other wheel. Therefore, if any computer of a compared group of wheels counts "two," an undesirable condition exists. A relay is attached to each wheel computer, and is operated when its computer counts two. This relay indicates which wheel is at fault and makes corrections by controlling the driving power or braking power applied to the wheel.

The invention, its arrangement, structure and method of operation, and additional objects and features thereof will be better understood by reference to the following disclosure and drawings, forming a part thereof wherein:

Figure 3 is a schematic illustration of a circuit by means of which an inoperative latch circuit may be tripped into operation;

Figure 4 is a schematic representation of a circuit by means of which an operated latch circuit may be rendered inoperative;

Figure 6A illustrates the pulse-phase output from signal generators on four axles plotted against time for the arrangement shown in Figure 5; and Figure 6B illustrates a ring cancellation diagram that is effective in the arrangement of Figure 5.

Figure 5:
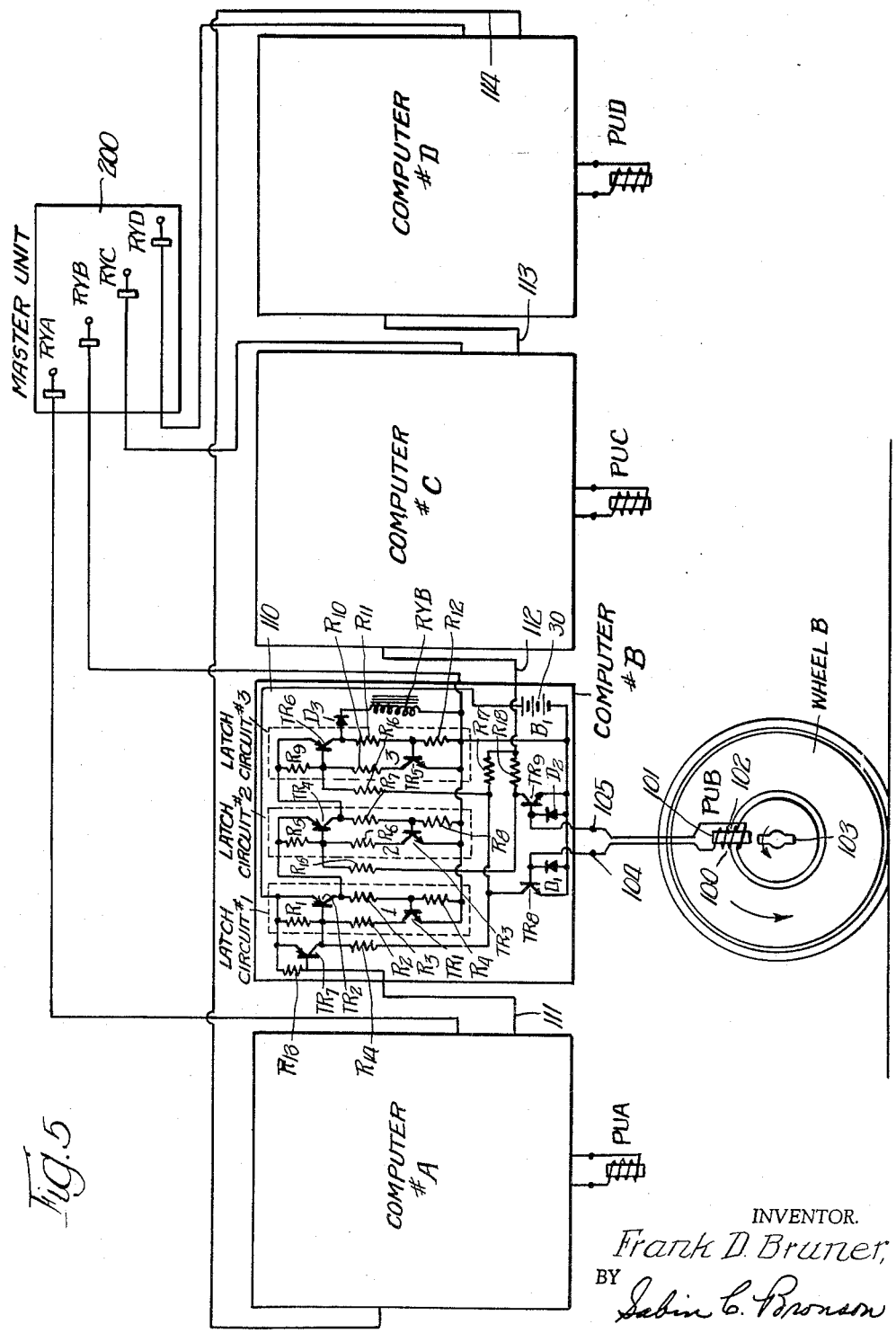
Figure 5 illustrates partially in block form and partially in schematic form a computer system arrangement in accordance with the present invention whereby detection of sliding and of slipping wheels is achieved.

Referring now to the drawings, as best shown in Figure 5, the system in accordance with the invention includes a signal generator 100 for each axle, a computer 110 associated with each signal generator, and a master unit 200 which includes relays activated by the computers and supplemental control equipment for correcting any detected slip or slide condition of the wheels.

The function of the signal generator is to transmit alternating current signals to the computers indicative of axle or wheel speed. In one specific example the signal generator 100 may be a magnetic pickup made up of a permanent magnet 101 wrapped with a numbered turns of wire 102 and a metallic probe 103. The permanent magnet is mounted preferably in a fixed position on the wheel hub and is not rotated with the wheel whereas the metallic probe 103 is preferably mounted directly on the axle and is rotatable with the axle and wheel.

When a magnetic material capable of attracting magnetic lines of force is moved towards the permanent magnet, the normal magnetic force lines within the pickup are disturbed. The force line movement from the permanent magnet to the approaching metal is through the turns of the coil wrapped around the magnet which produces a voltage across the coil making one terminal positive with respect to the other. As the piece moves away from the permanent magnet, the potential on the terminals is reversed. In general then, when the metallic probe 103 passes the permanent magnet, a pulse consisting of an alternating current cycle having a positively oriented approach phase and a negatively oriented leave phase is transmitted to the corresponding computer. The computer design takes advantage of this phase reversal in computing the number of times the bars pass the permanent magnet 101.

Figure 1:
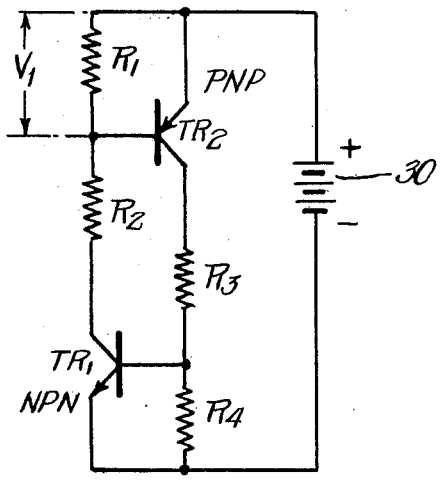
Figure 1 shows a transistor latch circuit employed as a counter stage in the arrangement of the present invention.

Referring now to the computer arrangement, Figures 1, 2, 3, 4, and 5 demonstrate how the circuit functions as a switch system. In Figure 1 there is illustrated a latch circuit made up of transistors TR1 and TR2 and resistors R1, R2, R3 and R4. In the arrangement shown, the transistor TR1 is of the NPN semi-conductor type and the transistor TR2 is of the PNP semi-conductor type. In the arrangement shown, each transistor is dependent upon the other to furnish an operating bias in order to render the circuit operative or "latched." When a potential from a constant source such as the battery 30 is applied to the circuit, neither of the transistors TR1 and TR2 will conduct. However, if a voltage $V_1$ were to appear across the resistor R1 so as to bias the transistor TR2 conductive, both transistors TR1 and TR2 would begin to conduct and would continue to conduct even after the starting voltage is removed. Thus the circuit is a self-locking circuit wherein responsive to conduction of the transistor TR2, a current flows from the collector electrode of the transistor TR2 through resistors R3 and R4 thereby to establish an operating bias between the base and the emitter electrode of the transistor TR1. Thereupon the transistor TR1 is rendered conductive and a current flows through the resistors R1 and R2 to the collector electrode thereof thereby establishing an operating bias for the transistor TR2 between the emitter and base electrodes thereof. In this condition, the circuit is said to be locked or latched.

Figure 2:
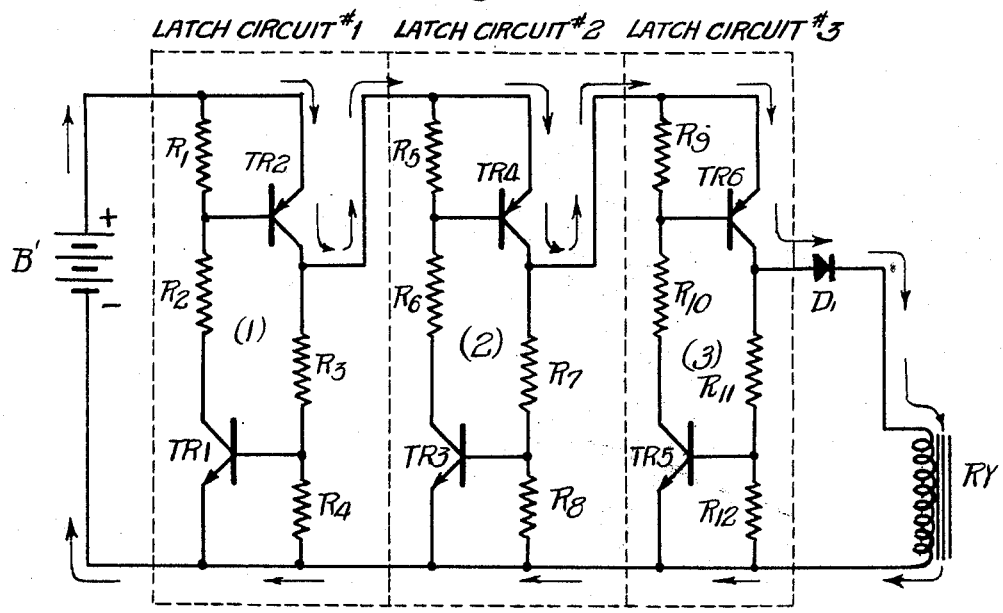
Figure 2 is a schematic diagram of a computer employing a plurality of latch circuits such as shown in Figure 1.

Figure 2 illustrates a basic computer arrangement made up of three latch circuits substantially identical to the latch circuit illustrated in Figure 1. In this arrangement, the latch circuits are linked by a connection extending between the collector electrode of the PNP transistor in the preceding latch circuit and the emitter electrode of the PNP transistor in the succeeding latch circuit. The stages being connected in chain the latch circuit No. 2 can be activated only when the latch circuit No. 1 is turned on or latched. Thereupon current is made available to the latch circuit No. 2 which circuit then can be rendered operative by a bias voltage applied across the resistor R5 between the emitter and base electrode of the transistor TR4. Responsive to such an operating bias voltage, the latch circuit No. 2 will be rendered operative or latched and provide operating current to the latch circuit No. 3. In the latch circuit No. 3, the transistor TR6 will be rendered conductive and the circuit latched responsive to an operating bias being applied across the resistor R9 between the emitter and base electrode of the transistor TR6. Thereupon, a current path is completed through the resistors R11 and R12 and a parallel current path is completed through the diode D1 and the winding of relay RY.

A circuit by means of which the operating bias may be provided to the individual latch circuits is illustrated in Figure 3. The circuit of this arrangement includes the latch circuit shown in Figure 1 and in addition a resistor R14 and a transistor TR8 connected in parallel with resistor R2 and the transistor TR1. The transistor TR8 is of the NPN type and is biased by a source of potential here represented as a battery 31. The circuit of this arrangement allows current to flow through the resistor R1 as shown by the arrows and by a proper selection of the size of resistance R14, a bias voltage $V_1$ may be generated across the resistor R1 for purposes of turning the latch circuit on. Thereafter, if the operating bias from the source 31 is removed from the transistor TR8, the path including the resistor R14 and the transistor TR8 will be rendered non-conductive but an operating current will continue to flow through the resistor R1 because the transistors TR1 and TR2 will at that time be operative. From the foregoing, it is clear that a pulse signal will suffice for triggering the latch circuit into operation.

Operation of the latch circuit can be interrupted by use of a circuit such as illustrated in Figure 4. Therein there is shown a latch circuit substantially identical to that shown in Figure 1 but including in addition resistors R13 and R18 and transistors TR7 and TR9 connected in parallel with the latch circuit. In the arrangement shown, the transistor TR7 is of the PNP type with the emitter and collector electrodes thereof connected in parallel with resistor R1, the resistor R13 is connected between the emitter and base electrodes of the transistor TR7, and resistor R18 is connected between the base of the transistor TR7 and the collector electrode of transistor TR9, the emitter electrode of the transistor TR9 being connected to the emitter electrode of the transistor TR1. Operating bias for the transistor TR9 which is the NPN type is provided by a battery 31. The bias voltage 31 renders the transistor TR9 conductive which draws current in a path including the resistors R13 and R18, thereby developing an operating bias across the resistor R13 for rendering the transistor TR7 conductive. Conduction of the transistor TR7 provides a low impedance path about the resistor R1 thereby removing the operating bias from the transistor TR2 and rendering the latter non-conductive. Accordingly, the current path through the latch circuit is interrupted and the entire latch circuit rendered inoperative. From the foregoing, it is clear that a pulse signal will suffice for triggering the operative latch circuit so as to render it inoperative.

In the arrangement of Figure 5, and particularly in the detailed showing of computer B therein, the method of phase separation for operating the computer system is illustrated. This circuit incorporates the circuit arrangements of Figure 3 and Figure 4.

Considering the operation of the arrangement shown therein in Figure 5 responsive to the metallic probe 103 being driven through its approach phase with regards to the permanent magnet 101, a potential is developed across the terminals 104, 105 wherein the terminal 104 is rendered positive with respect to the terminal 105. Thereupon, an activating current for the transistor TR8 flows through the base-emitter path thereof and through the diode D2 to the terminal 105. Accordingly, the transistor TR8 is rendered conductive and current flows in a path from the positive terminal of the battery 30, through the resistor R1, and R14, through the collector-emitter path of the transistor TR8 to the negative terminal of the battery 30. Thereupon, the transistor TR2 is biased conductive and the latch circuit No. 1 is operative and operating current is provided to the latch circuit No. 2.

During the leave phase of the magnetic probe 103 relative to the permanent magnet 101, the terminal 105 is rendered positive with respect to the terminal 104 whereupon a current flows from the terminal 105 through the base-emitter path of the transistor TR9, and the diode D1 to the terminal 104. Thereupon the transistor TR9 is rendered conductive and current flows in a path from the positive terminal of the battery 30 through the emitter collector path of the transistor TR2, the resistors R5 and R15 and the collector emitter path of the transistor TR9 to the negative terminal of the battery 30. Thus an operating bias is developed across the resistor R5 for rendering the transistor TR4 conductive and for operating the latch circuit No. 2. With the latch circuit No. 2 in its latched or operated condition, a source of current is provided to the emitter-electrode of transistor TR6 of the latch circuit No. 3 for rendering the latter operative responsive to the application thereto of an operating bias.

With the latch circuits Nos. 1 and 2 operated, the computer B is said to have counted "one." This count is normal and if thereafter the computer is cleared by the latch circuits Nos. 1 and 2 being rendered inoperative and in a manner as explained hereinafter, the computer has completed a normal operative cycle. However, if at this time, the input terminal 104 should be again rendered positive with respect to the input terminal 105, the transistor TR8 will be rendered conductive in its base-emitter path in a manner as described above and current will flow from the positive terminal of the source 30 through the emitter-collector path of the transistor TR2, the emitter-collector path of transistor TR4, the resistors R9 and R16 and the collector-emitter path of transistor TR8 to the negative terminal of the battery 30. Thereupon an operating bias will be established across the resistor R9 and the transistor TR6 will be rendered conductive thereby causing the latch circuit No. 3 to operate. Conduction of current through the transistor TR6 and its collector electrode resistors R11 and R12 will permit a current flow through the diode D3 and the winding of the relay RYB to negative battery whereupon the relay RYB will be operated to indicate an abnormal condition in the computer B.

In the arrangement shown in Figure 5, the rotational speed of four axles, respectively the axles A, B, C, and D are compared one to another for purposes of establishing a synchronized axle speed corresponding precisely to the vehicle speed. Therein there is illustrated a plurality of computers corresponding respectively to the axles A, B, C, and D, each provided with a magnetic pickup PUA, PUB, PUC, and PUD, respectively, and a master unit 200 including the relays RYA, RYB, RYC, and RYD, corresponding, respectively, to the computer units. The master unit also includes equipment not shown which is operated in accordance with operation of various relays therein for controlling the braking power applied to any particular wheel in order to thereby avoid slipping or sliding of the wheel relative to the other wheels and to control frictional engagement between the wheel and the rail, for example, by sanding the rail.

To understand better how the system shown in Figure 5 operates, reference is made to Figures 6A and 6B. Figure 6A illustrates the pulse-phase output from the magnetic pickups PUA, PUB, PUC, and PUD of the four axles plotted against time. In the arrangement of Figure 6A, it is assumed that the wheels A and B are traveling at the speed of the vehicle so that they both transmit pulses to their respective magnetic pickups which are synchronously phased at the intervals V, W, X, Y and Z. As illustrated by the figure, wheel C is traveling faster than wheels A and B, indicating that it is slipping on the rail and is therefore transmitting more than one pulse during a pulse cycle of wheel B for example. The wheel D provides less than one pulse per pulse cycle of the wheel A or wheel B, thereby indicating that the wheel is sliding on the rail. These various pulses are applied to the corresponding computers in the system. How these signals are utilized in the system for purposes of producing abnormal conditions is considered further hereinafter.

Figure 6B is a ring diagram illustrating the manner in which the computers shown in Figure 5 are connected in chain and the manner in which the specific computers operate to control each succeeding computer in the chain.

Specifically, and referring both to Figures 5 and 6B, computer A operates through the conductor 111 extending to the computer B to cancel operation of the computer B, computer B operates through the conductor 112 to cancel operation of the computer C, computer C operates through the conductor 113 to cancel operation of the computer D and computer D operates through the conductor 114 to cancel operation of the computer A. The manner of circuit connection is best illustrated in the computer B of Figure 5 wherein the conductor 111 extends from the base electrode of the transistor TR7 to a junction in computer A which corresponds exactly to the resistors R17 and R18. Thus in computer B, for example, operating current to the collector electrode of the transistor TR8 can be drawn not only through the paths including the resistor R14 and the path including the resistor R16 but also through the path including resistor R17 which extends to the computer C. Similarly current for conduction of the transistor TR9 can be drawn to the collector electrode of the transistor TR9 not only from the path including the resistor R15 but also through the resistor R18 extending via the conductor 112 to the computer C. Thus each time the preceding wheel in a system causes a positive and negative pulse at its magnetic pickup a corresponding demand for current will be made on the next succeeding computer circuit in the chain. This demand is utilized for purposes of clearing the computer.

Considering how the computer circuit of Figure 5 might be cleared and assuming, for example, that at least the latch circuit No. 1 is operated, the occurrence of a pulse cycle in the computer A will cause a current demand at the conductor 111 which will produce a current flow through the resistor R13 and introduce an operating bias across the transistor TR7 thereby rendering the transistor conductive in its emitter-collector path and depleting the current flow through the parallel connected resistor R1. Thereupon the operating bias for the transistor TR2 is destroyed and the latch circuit No. 1 is rendered inoperative. When the latch circuit No. 1 is rendered inoperative, any of the other latch circuits Nos. 2 and 3 that might be operative, are also rendered inoperative.

From the foregoing explanation, it is obvious that if the pulses from two succeeding computers in the series chain are in synchronism, a current may never be drawn through the resistor R1 of the latch circuit No. 1 so that the latch circuit may never be operated. While this is a real possibility, it corresponds to the ideal situation where the axles are running continuously at the same speed as the vehicle.

However, with regards to computer C associated with the wheel C, starting at the time interval V, the first latch circuit of the computer C will be operated by the positive phase of a pulse PC1 and immediately thereafter the latch circuit No. 2 of the computer C will be operated by the negative phase of the same pulse. Before any other operation in the circuit, the third latch circuit of the computer will be operated by the positive phase of the next pulse PC2. Upon operation of the latch circuit, the relay RYC in the master unit will be operated. Immediately thereafter the positive phase of the pulse PB2 provided at the time W from the signal generator 100 associated with the wheel B will operate to clear the computer C so that the relay RYC will be restored. Thereafter the positive phase of the pulse PC3 will cause the latch circuit No. 1 to operate and the negative phase of the pulse PC3 will cause the latch circuit No. 2 to operate and the positive phase of the pulse PC4 will cause the latch circuit No. 3 to operate so that the relay RYC will again operate in the master unit. However, at approximately the same time, the positive phase of the pulse PB3 will operate to clear the computer C so that the relay RYC will restore. Thus the relay RYC will be operated intermittently at a rate corresponding to the speed differential between the wheel B and the wheel C until the fault condition is corrected.

Now in computer D, the pulses PC1 and PC2 from the computer C will maintain the computer D clear up to the time W. Because the pulses from the wheel C are occurring at a greater frequency than those from wheel D, the computer D will always be cleared before the latch circuit No. 3 thereof can be operated. Accordingly, the relay RYD will not operate.

In the computer A, the pulses PA1, PA2, PA3, and so forth, are occurring at a greater frequency than the pulses PD1, PD2, and so forth from the computer D whereby the latch circuit No. 3 of the computer A will be operated with frequency and then restored and again re-operated in the same manner as the relay RYC. The external circuits located in the master unit 200 are such that the operation of the relays RYA and RYC and their rates of operation will be interpreted to mean that the wheels of axle C are slipping whereas the wheels of axle D are sliding whereupon power and brake control to the respective axles will be controlled so as to bring the rotational speed of the axles into synchronism with the speed of the other axles in the group.

The important advantages of this arrangement for synchronizing axle speed of a driving vehicle is that the compensational measurement is performed on a variable time base independent of the speed of the vehicle, and there is no requirement for the use of measuring devices calibrated according to speed. Additionally, because of the integrated nature of the control system, the number of operations of the various relays per unit time can be utilized as a base for correcting any speed fault condition. Further because of the electronic nature of the arrangement and the fact that control means thereof are transistors, the power requirements for the system are very small and there is substantially no maintenance requirement. Further, detection can be made very accurate because it can be based on any fraction of a revolution of the wheel or axle by employing various configurations of metallic probes therewith and testing of the circuit can be easily accomplished by applying an A.C. signal to the magnetic pickups.

It will be obvious that there may be substituted for the relay RYB in each computer a control winding of a magnetic amplifier wherein the current flowing in the winding would shut or close off excitation of a magnetic amplifier excitation system. Direct shut-off of excitation using electrical energy from the third stages of each computer to saturate magnetic reactors, or bias control transistors, tubes and thyratrons, would eliminate the pick-up time required by relays RYB, etc., and reduce the reaction time of the control system to the time constant of associated transistors used in the detection system.

While the specific embodiments of the invention described herein are at present considered to be preferred, it is to be understood that variations and modifications may be made therein including substitutions for the transistor circuit described, without departing from the scope of the invention. It is intended to cover in the claims all such variations and modifications as fall within the true spirit and scope of the invention.

What is claimed is:

1. A speed differential detection system, comprising a first rotatable member, a first signal generator driven by said first rotatable member for providing first signals corresponding to the rotational speed thereof, a second rotatable member, a second signal generator, driven by said second rotatable member for providing second signals corresponding to the rotational speed thereof, information storage means provided with a first switch stage, and a second switch stage, and a third switch stage, connected in series with a source of energizing current and provided with a disabling circuit connected to said first switch stage, said first switch stage being rendered operative responsive to a positive signal from said second signal generator, said second switch stage being rendered operative responsive to the operation of said first stage and to a negative signal from said second signal generator, said third switch stage being rendered operative responsive to the operation of said second stage and to a positive signal from said second signal generator, said disabling circuit being responsive to a signal from said first signal generator for rendering said first switch stage inoperative, and alarm means, controlled from said information storage means responsive to the operation of the third stage thereof whereby responsive to the rotation of said second rotatable member at a rate greater than the rotation of said first rotatable member, said alarm means is operated at a rate corresponding to the speed differential therebetween.

2. A speed differential detection system comprising a first rotatable member, a first signal generator driven by said first rotatable member for providing signals corresponding to the rotational speed thereof, a second rotatable member, a second signal generator driven by said second rotatable member for providing alternating current signals corresponding to the rotational speed thereof, information storage means provided with a first switch stage and a second switch stage and a third switch stage connected in series with a source of energizing current and provided with a disabling circuit connected to said first switch stage, said first switch stage being rendered operative responsive to the positive phase of an alternating current signal applied from said second signal generator, said second stage being rendered operative responsive to the operation of said first stage and to the negative phase of an alternating current signal applied from said second signal generator, said third stage being rendered operative responsive to the operation of said second stage and to the positive phase of an alternating current signal applied from said second signal generator, said disabling circuit being responsive to a signal from said first signal generator for rendering said first switch stage inoperative, and alarm means controlled from said information storage means responsive to the operation of the third stage thereof, whereby responsive to rotation of said second rotatable member at a rate greater than the rotation of said first rotatable member said alarm means is operated at a rate corresponding to the speed differential therebetween.

3. A speed differential detection system comprising a first rotatable member, a first signal general driven by said first rotatable member for providing alternating current signals corresponding to the rotational speed thereof, a second rotatable member, a second signal generator driven by said second rotatable member for providing alternating current signals corresponding to the rotational speed thereof, a first computer and a second computer corresponding to said first and second signal generators respectively and connected in a series loop, each of said computers being provided with a first switch stage and a second switch stage and a third switch stage connected in series with a source of energizing current and being provided with a disabling circuit connected to said first switch stage, said first switch stage being rendered operative responsive to the positive phase of an alternating current signal applied thereto from the corresponding signal generator, said second stage being rendered operative responsive to the operation of said first stage and of the negative phase of an alternating current signal applied thereto from the corresponding signal generator, said third stage being rendered operative responsive to the operation of said second stage and of the positive phase of an alternating current signal applied thereto from the corresponding signal generator, said disabling circuit being responsive to a phase of the alternating current signal from the other of said signal generators for rendering said first switch stage inoperative, and a first alarm means and second alarm means controlled respectively from said first computer and from said second computer responsive to the operation of the third stages thereof, whereby responsive to rotation of said first rotatable member at a rate greater than said second rotatable member said first alarm means is operated at a rate corresponding to said speed differential and responsive to rotation of said second rotatable member at a rate greater than said first rotatable member said second alarm means is operated at a rate corresponding to said speed differential.

4. The speed differential detection system set forth in claim 3 wherein said first and second signal generators are of the magnetic type.

5. A speed differential detection system comprising a first rotatable member, a first signal generator driven by said first rotatable member for providing alternating current signals corresponding to the rotational speed thereof, a second rotatable member, a second signal generator driven by said second rotatable member for providing alternating current signals corresponding to the rotational speed thereof, a first computer and a second computer corresponding respectively to said first and second signal generators and connected in a series loop, each of said computers being provided with a first switch stage and a second switch stage and a third switch stage connected in series with a source of energizing current and being provided with a disabling circuit connected to said first switch stage, first means in each of said signal generators responsive to positive phases of said alternating current signals for completing a current path to the first and third switch stage of the corresponding computer and for operating said disabling circuit in the succeeding one of said series connected computers, second means in each of said signal generators responsive to negative phases of said alternating current signals for completing a current path to the second switch stage of the corresponding computer and for operating said disabling circuit in the succeeding one of said series connected computers, whereby said first and second and third switching stages in each of said computers are consecutively operable and any operated one of said switching stages are rendered inoperative by the operation of the associated disabling circuit, and a first alarm means and second alarm means controlled respectively from said first computer and from said second computer responsive to the operation of the third stages thereof, whereby responsive to rotation of said first rotatable member at a rate greater than said second rotatable member said first alarm means is operated at a rate corresponding to said speed differential and responsive to rotation of said second rotatable member at a rate greater than said first rotatable member said second alarm means is operated at a rate corresponding to said speed differential.

6. A speed differential detection system comprising a plurality of rotatable members the rotational speeds of which are to be compared in a series loop sequence, a corresponding plurality of signal generators for providing alternating current signals in accordance with the rotational speed thereof, a corresponding plurality of computers connected in a series loop, each of said computers being provided with a first switch stage and a second switch stage and a third switch stage connected in series with a source of energizing current and being provided with a disabling circuit connected to said first switch stage, first means in each of said signal generators responsive to positive phases of said alternating current signals for completing a current path to the first and third switch stage of the corresponding computer and for operating said disabling circuit in the succeeding one of said series connected computers, second means in each of said signal generators responsive to negative phases of said alternating current signals for completing a current path to the second switch stage of the corresponding computer and for operating said disabling circuit in the succeeding one of said series connected computers, whereby said first and second and third switching stages in each of said computers are consecutively operable and any operated one of said switching stages are rendered inoperative by the operation of the associated disabling circuit, and a corresponding plurality of alarm means operated respectively from the individually associated computers responsive to the operation of the third stage therein, whereby responsive to the rotation of any one of said rotatable members at a rate greater than the preceding one of the rotatable members in the comparison loop, the corresponding alarm means is operated at a rate corresponding to the speed differential therebetween.

7. The speed differential detection system set forth in claim 6 wherein the switching stages in each computer comprises a source of constant potential, a PNP type transistor connected in series with said source of potential via the emitter-collector path thereof and a first resistor and a second resistor, and a NPN type transistor connected in series with said source of potential via a third resistor and a fourth resistor and the collector-emitter path thereof, the base of said PNP type transistor being connected to the junction between said third and fourth resistors, the base of said NPN type transistor being connected to the junction between said first and second resistors.

8. The speed differential detection system as set forth in claim 7 wherein each preceding switching stage in each computer is connected at the collector electrode of the PNP transistor to the next succeeding switching stage at the emitter electrode of the PNP transistor.

9. The speed differential detection system as set forth in claim 8 wherein each of said alarm means includes a magnetic relay operative for performing alarm and control functions.

References Cited in the file of this patent

UNITED STATES PATENTS

| | | |
|---|---|---|
| 2,208,738 | Hines | July 23, 1940 |
| 2,232,752 | Wilson | Feb. 25, 1941 |
| 2,335,984 | Wilson | Dec. 7, 1943 |
| 2,735,090 | Maenpaa | Feb. 14, 1956 |
| 2,788,518 | Burns | Apr. 9, 1957 |
| 2,815,503 | Amos | Dec. 3, 1957 |
| 2,852,195 | Coleman et al. | Sept. 16, 1958 |
| 2,898,040 | Steele | Aug. 4, 1959 |